United States Patent [19]

Kato

[11] Patent Number: 4,618,220
[45] Date of Patent: Oct. 21, 1986

[54] TELEPHOTO ZOOM LENS

[75] Inventor: Masatake Kato, Tokyo, Japan

[73] Assignee: Canon Kabushiki Kaisha, Tokyo, Japan

[21] Appl. No.: 729,890

[22] Filed: May 2, 1985

Related U.S. Application Data

[63] Continuation of Ser. No. 652,421, Sep. 19, 1984, abandoned, which is a continuation of Ser. No. 373,642, Apr. 30, 1982, abandoned.

[30] Foreign Application Priority Data

May 13, 1981 [JP] Japan ................................. 56-70790

[51] Int. Cl.⁴ .............................................. G02B 15/00
[52] U.S. Cl. .................................................. 350/427
[58] Field of Search ........................ 350/427, 429, 430

[56] References Cited

U.S. PATENT DOCUMENTS

| | | | |
|---|---|---|---|
| 4,017,161 | 4/1977 | Tsuji | 350/427 |
| 4,172,635 | 10/1979 | Ogino | 350/426 |
| 4,348,082 | 9/1982 | Ogawa | 350/423 |

Primary Examiner—John K. Corbin
Assistant Examiner—Paul M. Dzierzynski
Attorney, Agent, or Firm—Toren, McGeady, Stanger, Goldberg & Kiel

[57] ABSTRACT

A telephoto zoom lens having four lens groups of which the 1st, counting from the front, has a positive refractive power, the 2nd has a negative refractive power, the 3rd has a positive refractive power and the 4th has a positive refractive power. The 1st, 2nd and 3rd lens groups form a varifocal section, and the 1st and 2nd lens groups axially move in opposite directions to each other when zooming. The amounts of movement of the 1st and 2nd lens groups relative to each other are thus controlled to achieve a shortening of the total length of the lens system.

3 Claims, 30 Drawing Figures

FIG.4a1
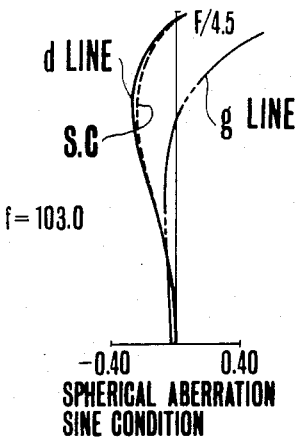
SPHERICAL ABERRATION
SINE CONDITION
FIG.4a2
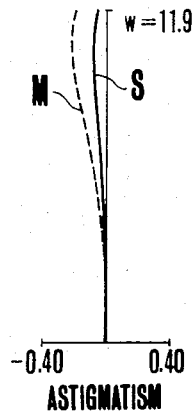
ASTIGMATISM
FIG.4a3
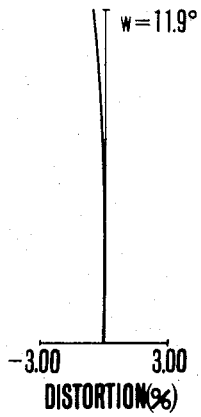
DISTORTION(%)
FIG.4b1
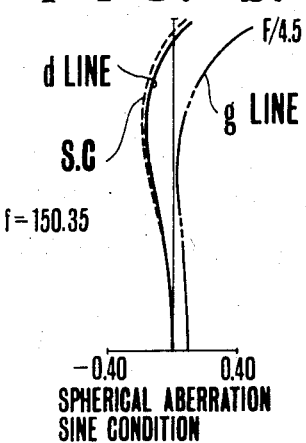
SPHERICAL ABERRATION
SINE CONDITION
FIG.4b2
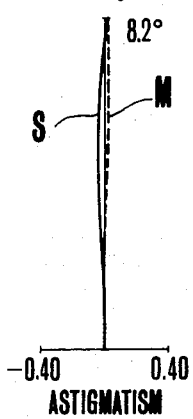
ASTIGMATISM
FIG.4b3
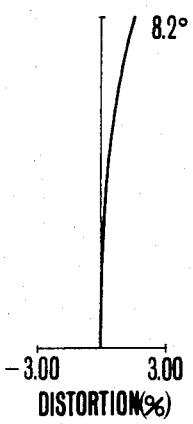
DISTORTION(%)
FIG.4c1
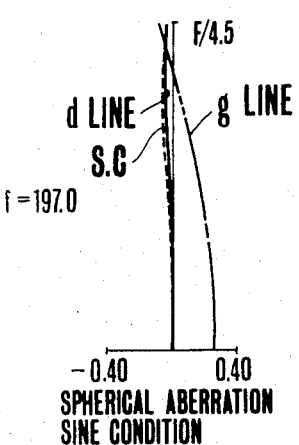
SPHERICAL ABERRATION
SINE CONDITION
FIG.4c2
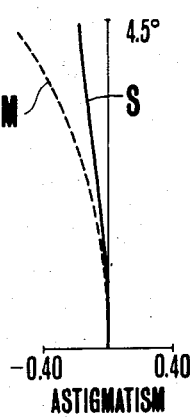
ASTIGMATISM
FIG.4c3
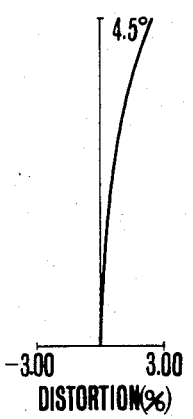
DISTORTION(%)

FIG.5a1 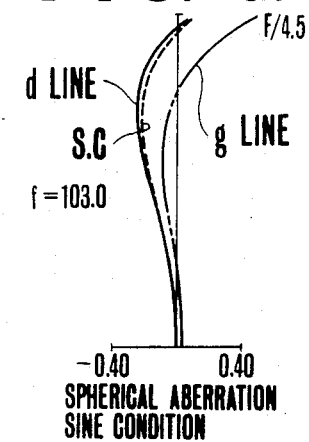
FIG.5a2 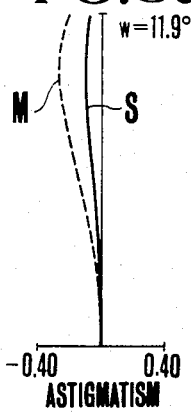
FIG.5a3 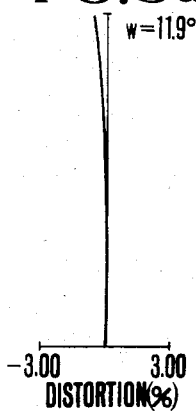
FIG.5b1 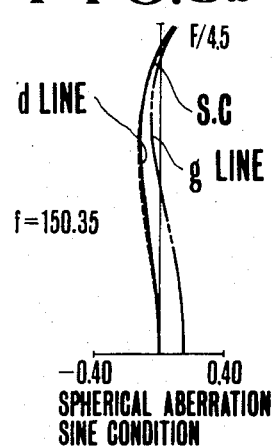
FIG.5b2 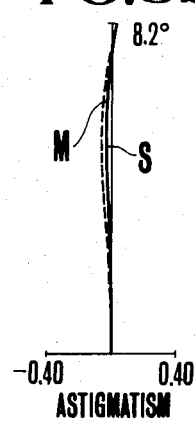
FIG.5b3 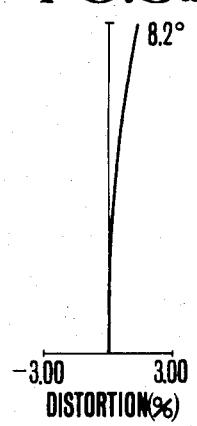
FIG.5c1 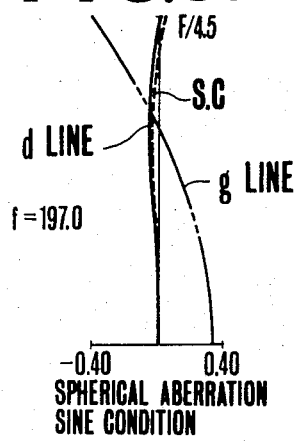
FIG.5c2 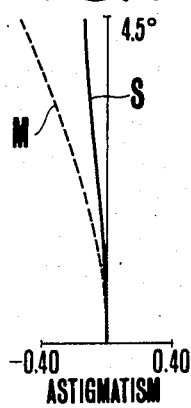
FIG.5c3 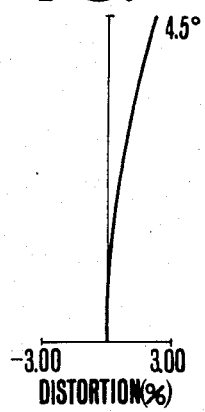

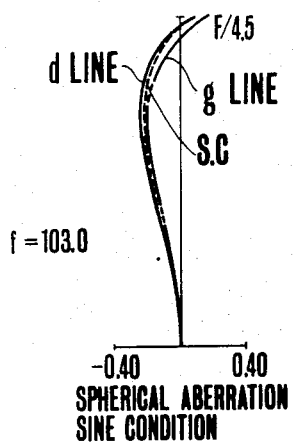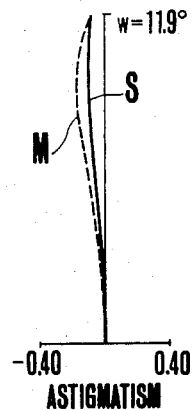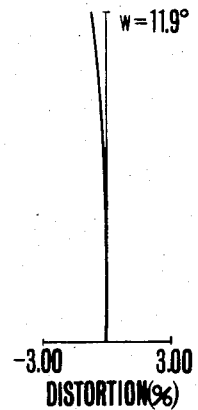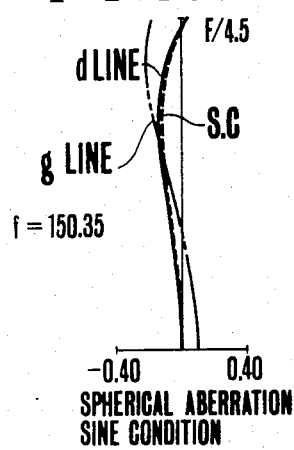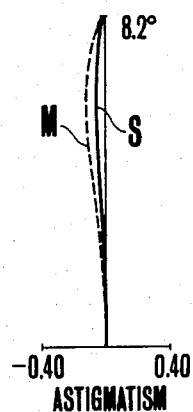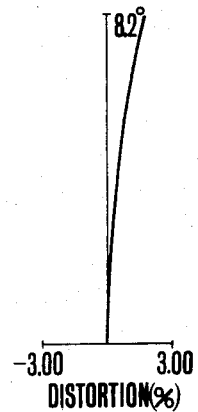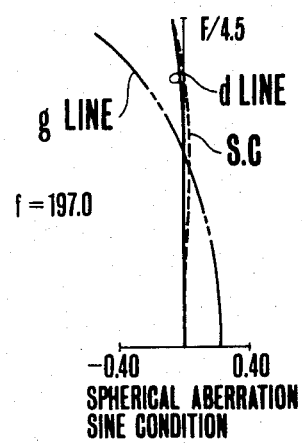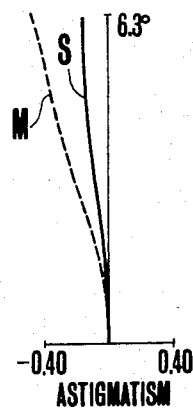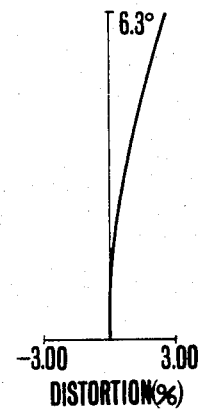

TELEPHOTO ZOOM LENS

This is a continuation of application Ser. No. 652,421, now abandoned filed Sept. 19, 1984, which was a continuation of application Ser. No. 373,642, filed Apr. 30, 1982, now abandoned.

BACKGROUND OF THE INVENTION

1. Field of the Invention

This invention relates to telephoto zoom lenses and, more particularly, to telephoto zoom lenses having four lens groups of which the first three counting from the front are movable to effect a change in image magnification, with the total length of the lens system being shortened.

2. Description of the Prior Art

In the past, as one type of zoom lens, there has been known a lens system consisting of four lens groups having positive, negative, positive and positive refractive powers arranged in this order from the front. In such zoom lens the 2nd lens group is moved axially to effect variation in the focal length, while the image shift compensation is effected by the axial movement of the 3rd lens group in a path concave toward the front. However, generally in this type of zoom lens, an increase in the zoom ratio or the relative aperture calls for a rapid increase of the total length of the lens system or the diameter of the front lens members. Further, to maintain the constant total length of the lens system during zooming, a large limitation must be given to the ratio of the distance from the front vertex to the focal plane to the longest focal length, that is, the telephoto ratio. Also, to suppress this to a minimum, the refractive power of each of the lens group in the varifocal section must be strengthened, thereby producing disadvantages that the necessary number of constituent lens elements is increased and good correction of principal aberrations becomes difficult to perform. On the other hand, it is known to provide zoom lenses of which the varifocal section includes three or more lens groups as in Japanese Laid-Open Patent No. Sho 53-34539, and U.S. Pat. Nos. 4,172,635, 4,196,969 and 4,240,760. These zoom lenses must however be provided with their operating mechanisms of complex structure, and such configuration cannot always be said to be suitable for use in the telephoto type zoom lens.

SUMMARY OF THE INVENTION

It is an object of the present invention to provide a telephoto zoom lens of very simple configuration in the expanded form of the conventional two-movable component zoom type that three lens groups are axially moved, while still permitting the total length of the lens system to be shortened when in the shortest settings.

A feature of lens construction of the telephoto zoom lens which is considered to be characteristic of the present invention is that a 1st lens group of positive power, a 2nd lens group of negative power, a 3rd lens group of positive power and a 4th lens group of positive power are arranged in this order from the front and the 1st, 2nd and 3rd lens groups constitute a varifocal section, wherein the 1st and 2nd lens groups are axially moved in opposite directions to each other while the amounts of movement of the 1st and 2nd lens groups in differential relation are controlled, thus accomplishing the object of the present invention.

BRIEF DESCRIPTION OF THE DRAWINGS

FIGS. 4-a-1 to 3, 4-b-1 to 3 and 4-c-1 to 3 are aberration curves of the lens of FIG. 1.

FIGS. 5-a-1 to 3, 5-b-1 to 3 and 5-c-1 to 3 are aberration curves of the lens of FIG. 2.

FIGS. 6-a-1 to 3, 6-b-1 to 3 and 6-c-1 to 3 are aberration curves of the lens of FIG. 3.

DETAILED DESCRIPTION OF THE PREFERRED EMBODIMENTS

Figure 1:
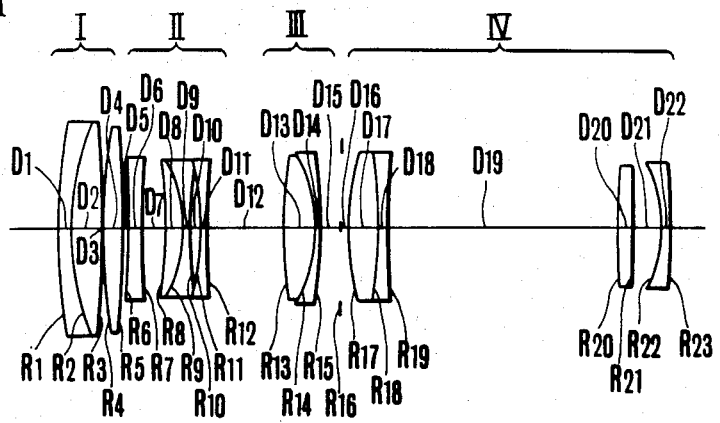
FIGS. 1, 2 and 3 are lens block diagrams of embodiments 1, 2, and 3 of telephoto zoom lenses according to the present invention respectively.
Figure 2:
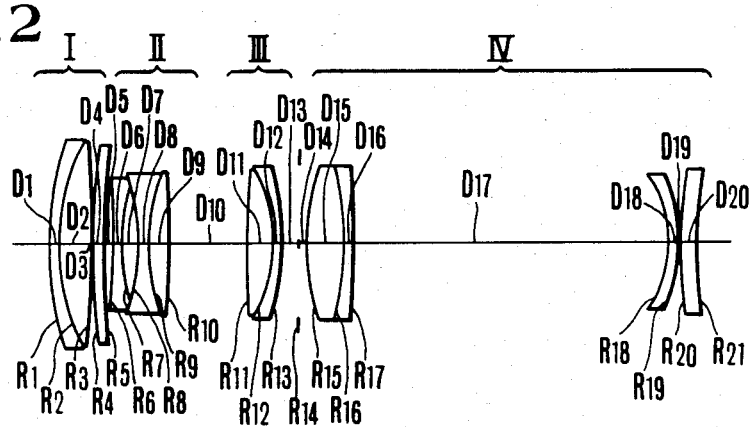
Figure 3:
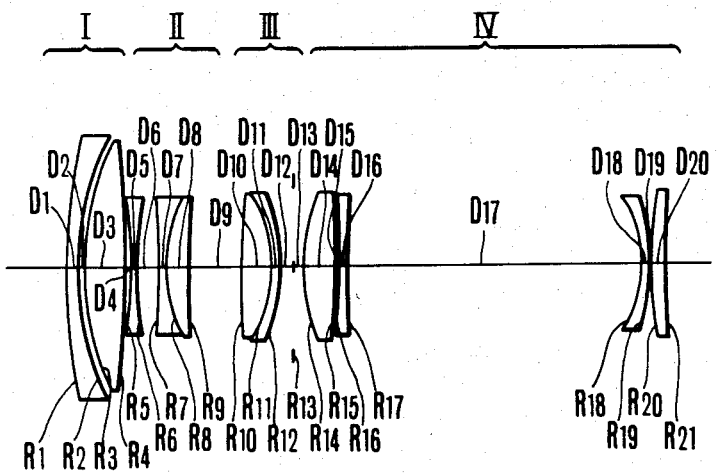

The zoom lens of the invention will be better understood from the following descriptions made with reference to the drawings. The zoom lens comprises, from front to rear, a 1st lens group I of positive power, a 2nd lens group II of negative power, and a 3rd lens group III of positive power and further includes a 4th lens group IV for forming an image of an object. Letting fI, fII, fIII and fIV denote the focal lengths of the lens groups I to IV respectively, $e'_1$ the interval between the principal planes of the 1st and 2nd lens groups I and II when in the shortest focal length position, $e'_2$ the interval between the principal planes of the 2nd and 3rd lens groups II and III, $\xi$, $\eta$ and $\gamma$ the amounts of movement of the 1st, 2nd and 3rd lens groups I, II and III by taking the positions of the 1st, 2nd and 3rd lens groups I, II and III when in the shortest focal length setting as respective start points with a position sign being given when measured along the optical axis from the front to rear, $\xi a$ and $\eta a$ the total movements of the 1st and 2nd lens groups I and II from the shortest to the longest focal length position, Z the zoom ratio, and $Ka(=\xi a/\eta a)$ the ratio of the total movement of the 1st lens group I to that of the 2nd lens group II, we have the amount of movement $\gamma$ of the 3rd lens group III as a solution of the following quadratic equation:

$$\gamma^2 \cdot P \cdot (\eta - \xi - p) + \gamma\{-\eta^2 \cdot P + \eta \cdot \xi \cdot P + \eta[Q \times$$
$$(fI + e'_2 - e'_1 - fIII) + fIII \cdot p(e'_1 - e'_2 - fI)] -$$
$$\xi[Q(e'_2 - fII - fIII) + fIII \cdot p(fII - e'_2)] +$$
$$2fIII \cdot p \cdot Q - Q^2\} + \eta^2 \cdot fIII^2 \cdot p - \eta \cdot \xi \cdot fIII^2 \cdot p - \eta \cdot$$
$$fIII^2(fI - e'_1)(fI + 2fII - e'_1) - \xi \cdot fII^2 \cdot fIII^2 = 0$$

where $p = (fI + fII - e'_1)$ $P = p \times (e'_2 - fIII) - fII \times (fI - e'_1)$ $Q = p \times e'_2 - fII \times (fI - e'_1)$ In the present invention, to vary the focal length of the entire lens system, the 1st and 2nd lens groups I and II are made to be axially movable in opposite directions to each other. In this case, as the 1st lens group I is pulled out forward by the actuator, the 2nd lens group II has to move in driven connection thereto, so that when the amount of movement of the 2nd lens group II is far larger than that of movement of the 1st lens group I, an unduly large stress is put on the operating mechanism. Though this drawback can be overcome by using an alternate arrangement where the 2nd lens group II is moved by the actuator, while the 1st lens group is made to follow it up, it is found that since the amount of movement $\xi$ of the 1st lens group I is small, the advantage of the invention is reduced, being almost equal to that expected from the conventional type of zoom lens in which only one or the 2nd lens group II is moved to effect a change in focal length.

On the other hand, when the amount of movement $\xi$ on the 1st lens group I is very large, the total length of the lens system when in telephoto settings becomes longer so that though the aberration correction becomes easy, the diameter of the front lens members must be increased to an objectionable point. In the present invention, a good result is obtained by satisfying the following conditions:

$$-5.1 < Ka < -0.4 \quad (1)$$

where Ka is the ratio of the total movement of the 1st lens group I to that of the 2nd lens group II.

Also in the present invention, with the 1st and 2nd lens groups made to move on the common optical axis in opposite directions to each other rectilinearly so that the on-axis rays emerge out of the 3rd lens group III almost in parallelism, it is made possible to eliminate variation with zooming of aberrations by simple techniques and also to minimize the zonal spherical aberration. It is to be noted that the 1st and 2nd lens groups I and II may be moved non-rectilinearly.

Further, for a lens system in which the 3rd lens group III takes the same position when in the shortest and longest focal length settings we have the following formula:

$$p^2 = -Z \times fII^2(K-1)$$

$$\eta a(1-K) = p \times (1 - 1/Z)$$

where K is the ratio of the amount of movement $\xi$ of the 1st lens group I to that of movement $\eta$ of the 2nd lens group II.

At this time, the focal length fIII of the 3rd lens group III is determined by:

$$fIII = e'_2 - [fII \cdot (fI - e'_1)]/p$$

imparting of such perfect reciprocating motion to the 3rd lens group III produces an advantage that, since the 3rd lens group III lies at the same point in position for both of the shortest and longest focal lengths of the entire lens system and contributes equal aberrations to the system, all that is needed to be taken into account is the stability of aberration correction in the intermediate focal length region. It is therefore made possible to construct even the 3rd lens group in the form of a singlet lens.

In order that the ratio K obtained by solving the above equations satisfies the before-mentioned condition (1), it is preferred to set forth the following conditions:

$$1.4 < (fI + fII - e'_1)^2/(Z \cdot fII^2) < 6.1 \quad (2)$$

$$1.4 < (fI + fII - e'_1)(1 - 1/Z)/\eta a < 6.1 \quad (3)$$

When the lower limits of conditions (2) and (3) are exceeded, as the amount of movement of the 1st lens group I becomes relatively small to the amount of movement of the 2nd lens group II, the refractive power of the 1st lens group I must be strengthened. If the number of lens elements constituting the 1st lens group is not increased, it becomes difficult to remove the variation of aberrations with focusing to shorter object distances. Further, the amount of movement of the 2nd lens group II increases. To avoid this, by strengthening the refractive power of the 2nd lens group II, the refractive power of each of the other lens groups must be necessarily increased, thereby giving a disadvantage that the range of variation of spherical aberration with zooming is increased. On the other hand, when the upper limits of conditions (2) and (3), the amount of movement of the 1st lens group I becomes relatively large to the amount of movement of the 2nd lens group II. This calls for an increase in the total length of the lens system when in the longest focal length positions and an increase in the diameter of the front lens members. In addition thereto, it becomes difficult to remove the positive distortion in the long focal length positions.

Therefore, the choice of a refractive power distribution satisfying conditions (2) and (3) makes it possible to reduce the increase of the Petzval sum in a negative sense resulting from the limitation of the telephoto ratio to a minimum, for the total length of the lens system would be otherwise elongated in the long focal length positions, and makes it possible to eliminate variation of the spherical aberration resulting from the increase in the refractive power of each of the lens groups. Moreover, since the total length of the lens system in the short focal length positions is short, the burden of carrying about the lens in attachment to the camera body can be considerably reduced.

Next, the numerical data for embodiments of the invention satisfying the above-cited conditions are given. The embodiments are zoom lenses having a focal length range of 103 to 197 mm with an F-number of 1:4.5. In the following tables, Ri is the radius of curvature of the i-th lens surface counting from the front, Di is the i-th axial lens thickness or air separation counting from the front, and Ni and $\nu i$ are respectively the refractive index of Abbe number for spectral d-line of the glass from which the i-th lens element counting from the front is made up.

| Example 1 F=103−197 FNo.=1:4.5 2ω=24−12 | | | | |
|---|---|---|---|---|
| | fI=94.81 | | | |
| I | R1=109.46 | D1=2.30 | N1=1.80518 | $\nu$1=25.4 |
| | R2=59.49 | D2=7.00 | N2=1.61800 | $\nu$2=63.4 |
| | R3=−1037.84 | D3=0.15 | | |
| | R4=110.78 | D4=4.00 | N3=1.61800 | $\nu$3=63.4 |
| | R5=−1888.22 | D5=Variable | | |
| | fII=−30.00 | | | |
| II | R6=−256.99 | D6=2.00 | N4=1.77250 | $\nu$4=49.6 |
| | R7=113.61 | D7=5.54 | | |
| | R8=−121.66 | D8=3.90 | N5=1.84666 | $\nu$5=23.9 |
| | R9=−30.80 | D9=1.50 | N6=1.69680 | $\nu$6=55.5 |
| | R10=234.21 | D10=1.86 | | |
| | R11=−55.78 | D11=1.36 | N7=1.69680 | $\nu$7=55.5 |
| | R12=199.81 | D12=Variable | | |
| | fIII=73.71 | | | |
| III | R13=126.42 | D13=6.80 | N8=1.65830 | $\nu$8=53.4 |
| | R14=−28.53 | D14=1.50 | N9=1.84666 | $\nu$9=23.9 |
| | R15=−55.96 | D15=Variable | | |
| | R16=0.0 | D16=1.50 | | |
| | fIV=135.63 | | | |
| IV | R17=49.80 | D17=7.00 | N10=1.58904 | $\nu$10=53.2 |
| | R18=−87.10 | D18=1.90 | N11=1.84100 | $\nu$11=43.2 |
| | R19=3540.44 | D19=51.02 | | |
| | R20=86.07 | D20=4.00 | N12=1.57845 | $\nu$12=41.5 |
| | R21=−353.40 | D21=5.98 | | |

-continued

Example 1
F=103—197  FNo.=1:4.5  2ω=24—12

| R22=−34.68 | D22=2.00 | N13=1.72000 | ν13=46.0 |
|---|---|---|---|
| R23=−113.86 | | | |
| D/F | 103.0 | 150.35 | 197.0 |
| D5 | 1.97 | 17.97 | 26.21 |
| D12 | 17.80 | 9.66 | 1.64 |
| D15 | 4.00 | 1.47 | 4.00 |

$(fI+fII-e'_1)^2/(ZfII^2)=1.53$
$(fI+fII-e'_1)(1-1/Z)/\eta a=1.5$

Example 2
F=103—197  FNo.=1:4.5  2ω=24—12 fI=120.68

I { 
R1=75.54   D1=2.20    N1=1.80518  ν1=25.4
R2=48.97   D2=7.00    N2=1.53996  ν2=59.5
R3=−384.66 D3=0.15
R4=157.01  D4=3.00    N3=1.51633  ν3=64.1
R5=315.56  D5=Variable fII=−36.0

II {
R6=−360.24  D6=1.60   N4=1.71285  ν4=43.2
R7=44.79    D7=4.13
R8=−42.08   D8=1.60   N5=1.74320  ν5=49.3
R9=39.05    D9=5.00   N6=1.80518  ν6=25.4
R10=−131.66 D10=Variable fIII=81.35

III {
R11=168.47  D11=6.80  N7=1.62374  ν7=47.1
R12=−30.21  D12=1.50  N8=1.80518  ν8=25.4
R13=−54.76  D13=Variable
R14=0.0     D14=1.50 fIV=144.04

IV {
R15=53.59   D15=8.00   N9=1.63930   ν9=44.9
R16=−81.31  D16=1.90   N10=1.84666  ν10=23.9
R17=904.24  D17=70.65
R18=−25.90  D18=1.78   N11=1.69350  ν11=53.2
R19=−38.22  D19=0.15
R20=61.74   D20=3.60   N12=1.67270  ν12=32.1
R21=82.98

| D/F | 103.0 | 150.35 | 197.0 |
|---|---|---|---|
| D5 | 1.63 | 25.14 | 37.26 |
| D10 | 16.56 | 8.58 | 0.72 |
| D13 | 4.00 | 1.52 | 4.00 |

$(fI+fII-e'_1)^2/(ZfII^2)=2.25$
$(fI+fII-e'_1)(1-1/Z)/\eta a=2.25$

Example 3
F=103—197  FNo.=1:4.5  2ω=24—12 fI=184.50

I {
R1=122.19   D1=2.50   N1=1.76182  ν1=26.6
R2=61.12    D2=1.20
R3=62.09    D3=9.00   N2=1.60729  ν2=49.2
R4=−335.00  D4=Variable fII=−40.0

II {
R5=−112.40  D5=1.60   N3=1.71300  ν3=53.8
R6=111.92   D6=4.70
R7=−89.96   D7=1.60   N4=1.69680  ν4=55.5
R8=32.55    D8=4.00   N5=1.80518  ν5=25.4
R9=118.98   D9=Variable fIII=73.81

III {
R10=184.12  D10=6.80  N6=1.58904  ν6=53.2
R11=−28.94  D11=1.50  N7=1.80518  ν7=25.4
R12=−44.98  D12=Variable
R13=0.0     D13=1.50 fIV=139.58

IV {
R14=41.40    D14=7.00   N8=1.61117   ν8=55.9
R15=−226.83  D15=0.90
R16=−108.81  D16=1.90   N9=1.84666   ν9=23.9
R17=978.60   D17=65.28
R18=−24.67   D18=1.78   N10=1.69680  ν10=55.5
R19=−47.73   D19=0.15
R20=91.58    D20=3.60   N11=1.59270  ν11=35.3
R21=−14415.58
D/F  103.0  150.35  197.0

-continued

Example 3
F=103—197  FNo.=1:4.5  2ω=24—12

| D4 | 1.43 | 44.10 | 66.09 |
|---|---|---|---|
| D9 | 12.60 | 7.17 | 1.83 |
| D12 | 4.00 | 2.32 | 4.00 |

$(fI+fII-e'_1)^2/(ZfII^2)=6.0$
$(fI+fII-e'_1)(1-1/Z)/\eta a=6.0$

What is claimed is:

1. A telephoto zoom lens comprising:
four lens groups, from front to rear, as follows:
the 1st lens group having a positive refractive power, the 2nd lens group having a negative refractive power, the 3rd lens group having a positive refractive power, and the 4th lens group having a positive refractive power;
said 1st, said 2nd and said 3rd lens groups forming a varifocal section, and when zooming from the wide angle side to the telephoto side, said 1st and said 2nd lens groups being moved axially in opposite directions in such a manner that the space between said 1st and 2nd lens groups gradually increases, thus effecting a change in image magnification, and said 3rd lens group reciprocates to compensate for the shift of an image plane resulting from the change of image magnification, and said 4th lens group being stationary; and satisfying the condition of $$1.4 < (fI+fII-e'_1)(1-1/Z)/\eta a < 6.1$$

wherein fI denotes the focal length of the 1st lens group, fII the focal length of said 2nd lens group, $e'_1$ the interval between the principal planes of said 1st and said 2nd lens groups when in the shortest focal length position, and Z the zoom ratio;
said 1st lens group consisting, from the object side, of a cemented lens comprising a negative meniscus lens convex towards the object side of a positive lens, and a positive lens;
said 2nd lens group consisting of a negative lens, a cemented lens comprising a positive meniscus lens and a negative lens, and a negative lens; and
said 3rd lens group consisting of a cemented lens comprising a positive lens and a negative meniscus lens.

2. A telephoto zoom lens comprising:
four lens groups, from front to rear, as follows:
the 1st lens group having a positive refractive power, the 2nd lens group having a negative refractive power, the 3rd lens group having a positive refractive power, and the 4th lens group having a positive refractive power;
said 1st, said 2nd and said 3rd lens groups forming a varifocal section, and when zooming from the wide angle side to the telephoto side, said 1st and said 2nd lens groups being moved axially in opposite directions in such a manner that the space between said 1st and 2nd lens groups gradually increases, thus effecting a change in image magnification, and said 3rd lens group reciprocates to compensate for the shift of an image plane resulting from the change of image magnification, and said 4th lens group being stationary; and satisfying the condition of $$1.4 < (fI+fII-e'_1)(1-1/Z)/\eta a < 6.1$$

wherein fI denotes the focal length of the 1st lens group, fII the focal length of said 2nd lens group, $e'_1$ the interval between the principal planes of said 1st and said 2nd lens groups when in the shortest focal length position, and Z the zoom ratio;
said 1st lens group consisting, from the object side, of a cemented lens comprising a negative meniscus lens convex towards the object side and a positive lens, and a positive lens;
said 2nd lens group consisting of a negative lens and a cemented lens comprising a negative lens and a positive lens; and
said 3rd lens group consisting of a cemented lens comprising a positive lens group and a negative meniscus lens.

3. A telephoto zoom lens comprising:
four lens groups, from front to rear, as follows:
the 1st lens group having a positive refractive power, the 2nd lens group having a negative refractive power, the 3rd lens group having a positive refractive power, and the 4the lens group having a positive refractive power;
said first, said 2nd and said 3rd lens groups forming a varifocal section, and when zooming from the wide angle side to the telephoto side, said 1st and said 2nd lens groups being moved axially in opposite directions in such a manner that the space between said 1st and 2nd lens groups gradually increases, thus effecting a change in image magnification, and said 3rd lens group reciprocates to compensate for the shift of an image plane resulting from the change of image magnification, and said 4th lens group being stationary; and satisfying the condition of $$1.4 < (fI + fII - e'_1)(1 - 1/Z)/\eta a < 6.1$$

wherein fI denotes the focal length of the 1st lens group, fII the focal length of said 2nd lens group, $e'_1$ the interval between the principal planes of said 1st and said 2nd lens groups when in the shortest focal length position, and Z the zoom ratio;
said 1st lens group consisting, from the object side, of a negative meniscus lens convex towards the object side and a positive lens;
said 2nd lens group consisting of a negative lens and a cemented lens comprising a negative lens and a positive lens, and said 3rd lens group consisting of a cemented lens comprising a positive lens and a negative meniscus lens.

* * * * *